United States Patent [19]

Miwa et al.

[11] Patent Number: 5,543,271

[45] Date of Patent: *Aug. 6, 1996

[54] OPTICAL RECORDING AND REPRODUCTION APPARATUS

[75] Inventors: Hiroaki Miwa, Fujisawa; Ryoichi Sudo, Yokosuka; Tetsuo Tajima, Fujisawa; Eiji Koyama, Tsuchiura, all of Japan

[73] Assignees: Hitachi, Ltd., Tokyo; Hitachi Maxell, Ltd., Osaka, both of Japan

[*] Notice: The term of this patent shall not extend beyond the expiration date of Pat. No. 5,401,610.

[21] Appl. No.: 375,730

[22] Filed: Jan. 20, 1995

Related U.S. Application Data

[60] Continuation of Ser. No. 53,483, Apr. 29, 1993, Pat. No. 5,401,610, which is a division of Ser. No. 855,511, Mar. 20, 1992, Pat. No. 5,244,775.

[30] Foreign Application Priority Data

Mar. 20, 1991 [JP] Japan ..................... 3-056460

[51] Int. Cl.$^6$ .................................. G11B 7/24
[52] U.S. Cl. .................. 430/347; 430/270.11; 430/945; 369/112
[58] Field of Search .................. 369/286, 100, 369/112, 121, 122; 430/270, 271, 273, 495, 945, 347, 270.11; 428/65.2

[56] References Cited

U.S. PATENT DOCUMENTS

| | | | |
|---|---|---|---|
| 4,799,210 | 1/1989 | Wilson et al. ..................... | 369/110 |
| 5,189,655 | 2/1993 | Ogata et al. ..................... | 369/44.23 |
| 5,214,630 | 5/1993 | Goto et al. ..................... | 369/44.14 |
| 5,318,653 | 6/1994 | Toide et al. ..................... | 156/295 |
| 5,401,610 | 3/1995 | Miwa et al. ..................... | 430/271 |

*Primary Examiner*—Charles L. Bowers, Jr.
*Assistant Examiner*—John A. McPherson
*Attorney, Agent, or Firm*—Antonelli, Terry, Stout & Kraus

[57] ABSTRACT

The object of the present invention is to provide an optical disc and a method of manufacturing thereof wherein defects and deterioration in the optical disc are minimized at the time of manufacture, during operation and storage thereof as well. The invention conceives an optical disc suitable for accomplishing the above object through specifications such as providing a cross-sectional structure thereof comprising a pair of transparent substrates each provided with at least one layer of a recording film formed on the surface of information patterns thereof, with the pair being bonded and laminated with an adhesive, and further providing an instantaneous axial acceleration <2 G measured at room temperatures, a skew angle <5 mrad measured at room temperatures, and a skew angle <5 mrad measured after being left for one hour as heated to 80° C. (otherwise, a shear mass <20 μm measured after being left for one hour as heated to 80° C.), and still further by utilizing a reaction adhesive the hardness of which after cure is between A30 and A80 in Shore hardness. On the other hand, preferred methods of manufacturing optical discs suitable for implementing the object of the invention were set forth, which utilize reaction adhesives having a Shore hardness after cure between A30 and A80.

26 Claims, 11 Drawing Sheets

EXTERIOR VIEW OF AN OPTICAL DISC

CROSS-SECTIONAL VIEW OF AN OPTICAL DISC

FIG. 4 — PROCESS DIAGRAMS EXPLANATORY OF MANUFACTURING PROCESSES OF AN OPTICAL DISC

FIG. 5 — PROCESS DIAGRAMS EXPLANATORY OF MANUFACTURING PROCESSES OF AN OPTICAL DISC

FIG. 6
PROCESS DIAGRAMS EXPLANATORY OF MANUFACTURING PROCESSES OF AN OPTICAL DISC
(g-3) 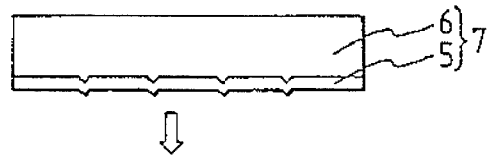
(h-3) 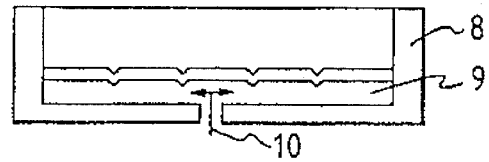
(i-3) 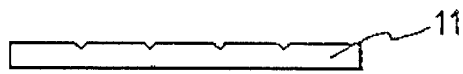
(j-3) 
(k-3) 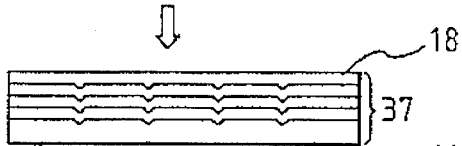
(l-3) 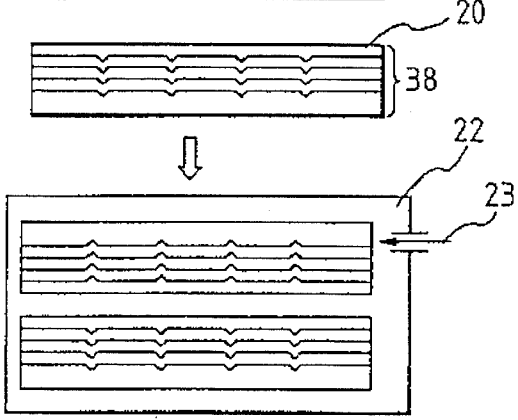
(m-3) 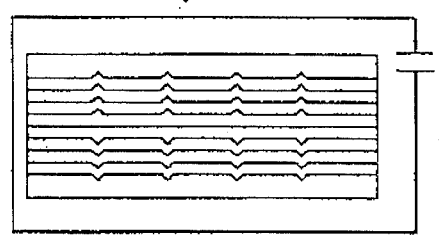
(n-3) 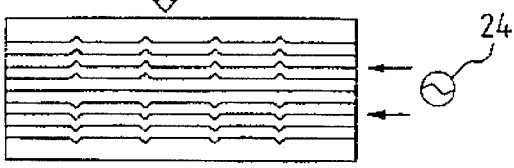

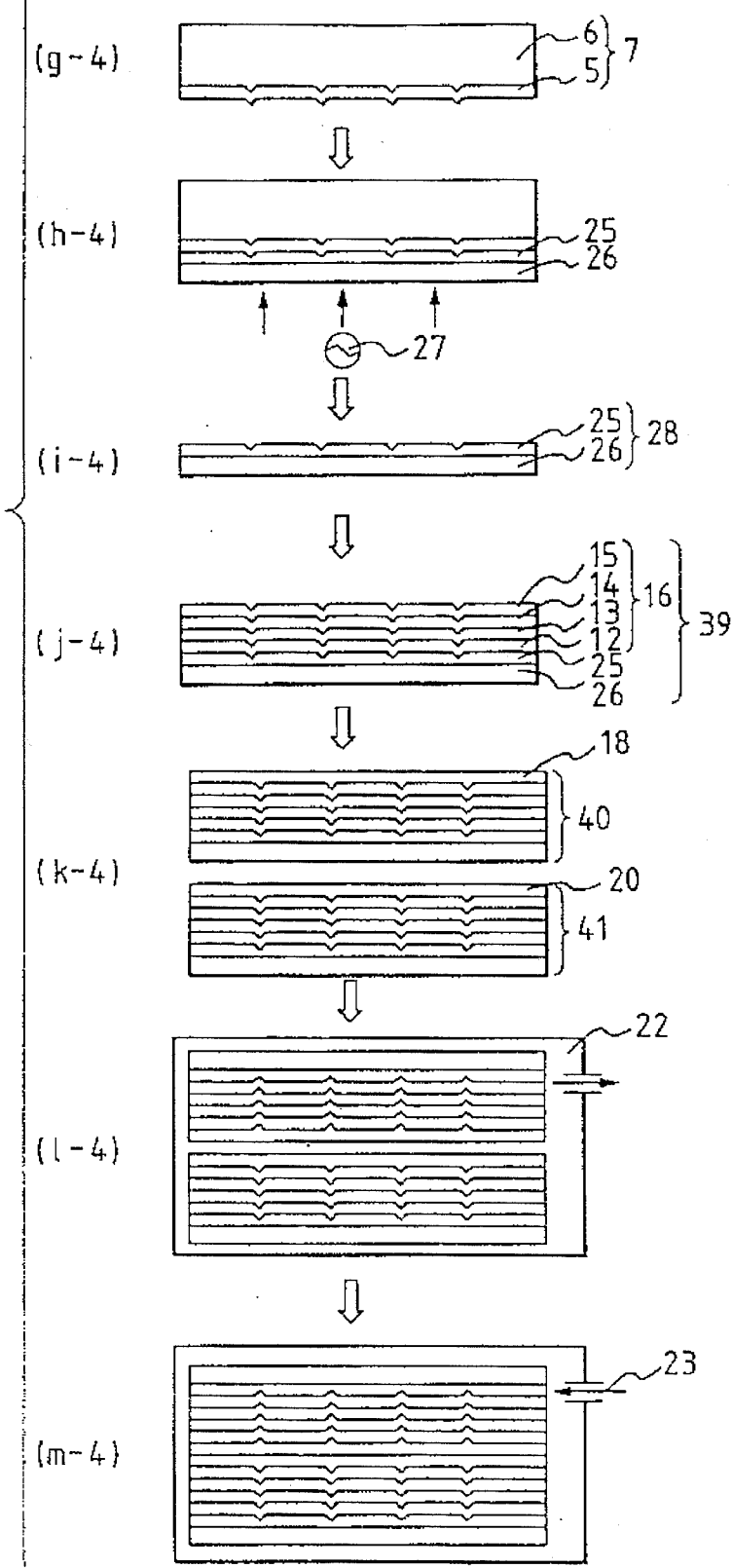

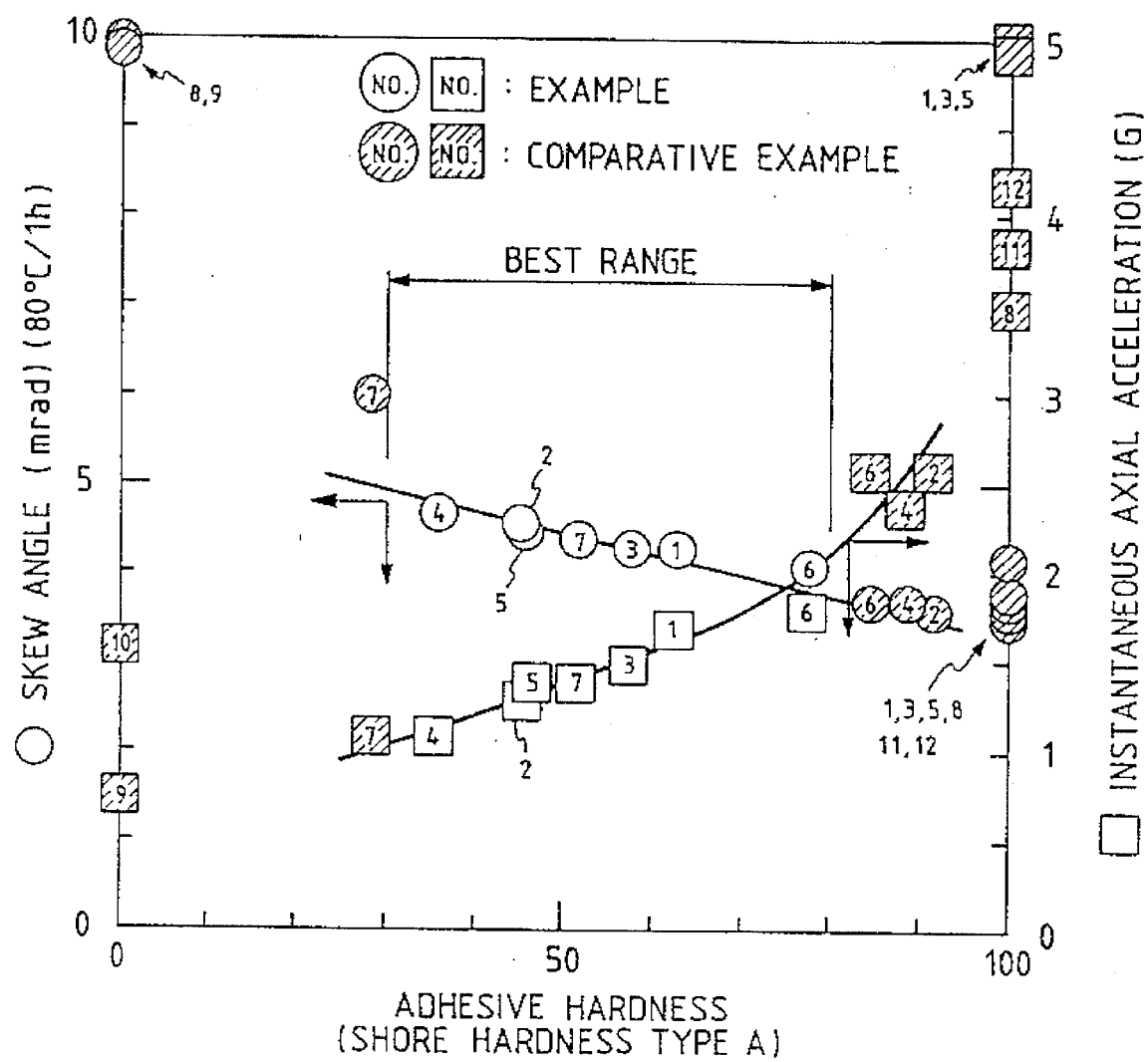

FIG. 9

COMPONENT OF REACTION ADHESIVE

| | COMPONENT | EXAMPLE | | | | | | | COMPARATIVE EXAMPLE | | | | |
|---|---|---|---|---|---|---|---|---|---|---|---|---|---|
| | | 1 | 2 | 3 | 4 | 5 | 6 | 7 | 1 | 2 | 3 | 4 | 5 |
| COMPONENT a | ANAEROBIC ADHESIVE | 60 | 40 | — | — | — | — | — | 100 | 80 | — | — | — |
| | ANAEROBIC ADHESIVE OF ACRYLATE GROUP LOCTITE 601 | — | — | 60 | 40 | — | — | — | — | — | 100 | 80 | — |
| | ANAEROBIC AND UV CURABLE ADHESIVE OF ACRYLATE GROUP LOCTITE 326 | — | — | — | — | 60 | 60 | 40 | — | — | — | — | 100 |
| COMPONENT b | ONEFUNCTIONAL ACRYLATE LAUYL ACRYLATE | 40 | 60 | 40 | 60 | 40 | — | — | 0 | 20 | 0 | 20 | 0 |
| | ONEFUNCTIONAL ACRYLATE PHENOXYETHYLACRYLATE | — | — | — | — | — | 40 | 60 | — | — | — | — | — |
| CHARACTERISTICS | SHORE HARDNESS TYPE A (TYPE D) | 62 | 45 | 57 | 36 | 46 | 76 | 51 | >100 (64) | 91 | >100 (60) | 88 | >100 (55) |
| | CUR TIME (s) | 68 | 82 | 71 | 95 | 70 | 79 | 110 | 43 | 54 | 51 | 58 | 53 |

FIG. 11
COMPONENT OF ADHESIVE

| COMPONENT | | COMPARATIVE EXAMPLE | | | |
|---|---|---|---|---|---|
| | | 9 | 10 | 11 | 12 |
| COMPONENT | HOT-MELT ADHESIVE | 100 | — | | |
| | HOT-MELT ADHESIVE (HIGH-PRESSURE LAMINATING) | — | 100 | | |
| | ONE-PART ANAEROBIC ADHESIVE | — | — | 100 | — |
| | TWO-PART UNMIXTURE ADHESIVE | — | — | — | 100 |
| CHARACTER-ISTICS | SHORE HARDNESS TYPE A (TYPE D) | <0 | <0 | >100 (84) | >100 (71) |
| | CUR TIME (s) | 0 | 0 | 42 | 35 |

FIG. 10
COMPONENT OF REACTION ADHESIVE

| COMPONENT | | COMPARATIVE EXAMPLE | | |
|---|---|---|---|---|
| | | 6 | 7 | 8 |
| COMPONENT a | ANAEROBIC ADHESIVE | — | — | — |
| | ANAEROBIC AND UV CURABLE ADHESIVE LOCTITE 601 | — | — | — |
| | ANAEROBIC AND UV CURABLE ADHESIVE LOCTITE 326 | 80 | 60 | 80 |
| COMPONENT b | ONEFUNCTIONAL ACRYLATE LAUYL ACRYLATE | — | — | — |
| | ONEFUNCTIONAL ACRYLATE PHENOXYETHYLACRYLATE | 20 | 40 | 20 |
| CHARACTER-ISTICS | SHORE HARDNESS TYPE A (TYPE D) | 81 | 28 | >100 (21) |
| | CUR TIME (s) | 59 | 95 | 64 |

FIG. 12

PROPERTY OF OPTICAL DISC FOR REACTION ADHESIVE

| ASSORTMENT | CHARACTERISTICS | EXAMPLE | | | | | | |
|---|---|---|---|---|---|---|---|---|
| | | 1 | 2 | 3 | 4 | 5 | 6 | 7 |
| ADHESIVE | SHORE HARDNESS TYPE A (TYPE D) | 62 | 45 | 57 | 36 | 46 | 76 | 51 |
| | INSTANTANEOUS AXIAL ACCELERATION (G) TARGET: <2G | 1.7 | 1.3 | 1.5 | 1.1 | 1.4 | 1.8 | 1.4 |
| OPTICAL DISC | SKEW ANGLE (mrad) TARGET: <5mrad | 3.8 | 4.1 | 3.9 | 4.2 | 3.9 | 3.1 | 3.6 |
| | SHEAR MASS (μm) 80°C/1h SHELF | 11 | 17 | 13 | 18 | 19 | 7 | 13 |
| | SKEW ANGLE (mrad) 80°C/1h SHELF | 4.3 | 4.6 | 4.3 | 4.7 | 4.5 | 4.0 | 4.4 |
| EXISTENCE OF DEFECT | MANUFACTURE TIME | ○ | ○ | ○ | ○ | ○ | ○ | ○ |
| | 80°C/1h SHELF | | | | ○ | | | |

FIG. 13

PROPERTY OF OPTICAL DISC FOR REACTION ADHESIVE

| ASSORTMENT | CHARACTERISTICS | | COMPARATIVE EXAMPLE | | | | | | | | | | | |
|---|---|---|---|---|---|---|---|---|---|---|---|---|---|---|
| | | | 1 | 2 | 3 | 4 | 5 | 6 | 7 | 8 | 9 | 10 | 11 | 12 |
| ADHESIVE | SHORE HARDNESS TYPE A (TYPE D) | | >100 (64) | 91 | >100 (60) | 88 | >100 (55) | 81 | 28 | >100 (21) | <0 | <0 | >100 | >100 |
| | INSTANTANEOUS AXIAL ACCELERATION (G) TARGET: <2G | | 5.4 | 2.6 | 5.6 | 2.4 | 5.4 | 2.6 | 1.1 | 3.5 | 1.5 | 3.2 | 3.8 | 4.3 |
| | SKEW ANGLE (mrad) TARGET: <5mrad | | 2.8 | 3.3 | 3.9 | 3.6 | 3.0 | 3.5 | 4.5 | 2.9 | 3.2 | 4.5 | 3.9 | 4.6 |
| | SHEAR MASS (μm) 80°C/1h SHELF | | 0 | 0 | 0 | 5 | 0 | 11 | 43 | 0 | >100 | >100 | 0 | 0 |
| | SKEW ANGLE (mrad) 80°C/1h SHELF | | 3.6 | 3.8 | 3.5 | 3.7 | 3.7 | 3.8 | 6.0 | 3.8 | >10 | >10 | 3.8 | 4.3 |
| OPTICAL DISC | EXISTENCE OF DEFECT | MANUFACTURE TIME | × | × | × | × | × | × | × | × | ○ | × | × | × |
| | | 80°C/1h SHELF | | | | | ○ | | | | × | × | ○ | ○ |

OPTICAL RECORDING AND REPRODUCTION APPARATUS

This is a continuation application of U.S. Ser. No. 08/053,483, filed Apr. 29, 1993, now U.S. Pat. No. 5,401,610 which is a divisional application of U.S. Ser. No. 07/855,511, filed Mar. 20, 1992, now U.S. Pat. No. 5,244,775.

BACKGROUND OF THE INVENTION

The present invention relates to an optical disc suitable for use in preservation, recording and reproduction of audio signals, images, information and the like, and also to a method of its manufacture.

The optical discs are generally composed of a pair of recording metal laminae each having grooves or pits shaped irregularities for servo tracking or the like, formed on a glass, transparent plastic or the like transparent replica substrate, with the same metal laminae disposed at a certain distance facing each other and bonded together with adhesive. Recently, increasing demands for such optical discs to increase the amount of information to be stored, to speed up the processing speed or the like are becoming greater at a rapid pace. In order to satisfy such demands, it is necessary to increase memory capacity and to rotate the optical discs at a higher speed.

Thereby, in lamination bonding of the substrates as processed as above in prior art optical discs, the following adhesives are used because of the simplicity, reduced-cost and the like in their manufacture. (1) thermoplastic hot-melt adhesives, (2) one-part anaerobic adhesives as disclosed in Japanese Patent Publication Laid-Open No. 61-151853, which was a reactive adhesive utilized to suppress disc deformation, and (3) two-part unmixture adhesives as disclosed in Japanese Patent publication No. 61-50231.

These methods, however, involve the following problems, respectively. That is, (1) the thermoplastic hot-melt adhesive is inevitably accompanied with at least one of the defects resulting from heat when applying the adhesive or from pressure when lamination bonding, plastic or elastic deformation during a high speed operation, and warp or peeling due to aging during storage. Further with respect to the reactive adhesive, (2) the one-part anaerobic adhesive, as it cures in a second order and is bonded and laminated under normal pressures, allows air bubbles to form readily therein which are difficult to evacuate once included, thereby the same is cured with the air bubbles as included into a hard body which is too hard to absorb the air bubbles as much as sufficiently to relax them, thereby resulting in a poor flatness of the surface of the disc, or causing defects due to corrosion in the recording layer or medium due to uncured parts in the air bubbles. (3) The two-part unmixture adhesive is applied separately of the two-parts to a thickness of several tens μm, respectively, then bonded together. At that time, as thus applied films are provided in a thick liquid form, there occurs a flow of the adhesive in the interface of lamination bonding due to the pressure applied at the time of lamination bonding, thereby causing uneven mixing thereof, thus, uneven curing, and further because of the hardness of the cured body, there occur wrinkles in the recording layer or medium, which becomes a cause of a poor performance in recording and reproduction.

As explained hereinabove, the prior art method (1) has the problem that there occur defects at least at the time of manufacture, at the time of utilization or at the time of storage of the optical discs. Further, with respect to the prior art methods (2) and (3), there arises a problem at the time of manufacture of the optical discs.

OBJECT AND SUMMARY OF THE INVENTION

The main object of the present invention is to solve the foregoing problems in the prior art, and to provide an optical recording and reproduction apparatus including an optical head and an optical disc in which the defects at the time of manufacture thereof, deformation due to high speed access or high speed rotation during its operation, and warp or peeling due to aging during storage of the optical disc are minimized, and also a method of its manufacture.

This object of the invention with respect to the optical disc, is capable of being accomplished by providing at least one of the following means from (A) to (C).

(A) An optical recording and reproduction apparatus including an optical head and an optical disc having a cross-sectional structure comprising a pair of transparent substrates, each having at least one layer of a recording film formed on its surface having information patterns, and each bonded together with adhesive, wherein the same is characterized by having an instantaneous axial acceleration <2 G measured at room temperatures, a skew angle <5 mrad measured at room temperatures, and a skew angle <5 mrad measured at room temperatures after being left for one hour as heated at 80° C.

(B) An optical recording and reproduction apparatus including an optical head and an optical disc having a cross-sectional structure comprising a pair of transparent substrates, each having at least one layer of a recording film formed on its surface having information patterns, and each bonded together with adhesive, wherein the same is characterized by having an instantaneous axial acceleration <2 G measured at room temperatures, a skew angle <5 mrad measured at room temperatures, and a shear mass <20 μm measured at room temperatures after being left for one hour as heated at 80° C.

(C) An optical recording and reproduction apparatus including an optical head and an optical disc having a cross-sectional structure comprising a pair of transparent substrates, each having at least one layer of a recording film formed on its surface having information patterns, and each bonded together with adhesive, wherein said adhesive is characterized by being a reactive type adhesive which has a Shore hardness between A30 and A80 after cure.

Further, the methods of manufacturing such optical recording and reproduction apparatus as above can be accomplished by providing at least one of the following processes from (D) through (F) for manufacturing the optical disc thereof.

(D) A method of manufacturing optical discs characterized by comprising steps of:
  (1) forming a ultraviolet (UV) curing resin on the surface of a stamper which has information patterns, and forming a transparent substrate over said UV curing resin,
  (2) irradiating ultraviolet rays for exposure, and transferring the information patterns from the surface of the stamper to the UV cured resin and the transparent substrate,
  (3) removing or severing the UV cured resin and the transparent substrate from the surface of the stamper having the information patterns, and obtaining a replica substrate thereof, (4) forming a recording film (lamina) on the surface of the replica substrate having duplicated information patterns, and (5) disposing a pair of replica substrates each provided with a recording film such that the sides of the recording films face each other, and bonding and laminating the pair with reactive adhesive which has a Shore hardness between A30 and A80 after cure.

(E) A method of manufacturing optical discs characterized by comprising steps of:

(1) forming a transparent substrate on the surface of a stamper having information patterns, and transferring the information patterns from the stamper to the transparent substrate, (2) severing the transparent substrate off from the surface of the stamper having information patterns, and obtaining a replica substrate, (3) forming a recording film on the surface of the replica substrate having information patterns, and (4) disposing a pair of replica substrates each provided with a recording film such that the sides of the recording films face each other, and bonding and laminating the pair with reactive adhesive which has a Shore hardness between A30 and A80 after cure.

(F) A method of manufacturing optical discs characterized by comprising steps of forming a recording film on the surface of the replica substrate having information patterns, disposing a pair of replica substrates each provided with a recording film such that the sides of the recording films face each other, and bonding and laminating the pair with reactive adhesive which has a Shore hardness between A30 and A80 after cure.

BRIEF DESCRIPTION OF THE DRAWINGS

FIG. 6 shows still another process diagram explanatory of manufacturing processes of an optical disc.

FIG. 7 shows still further process diagram explanatory of manufacturing processes of an optical disc.

FIG. 8 shows relationships between skew angles and adhesive hardness and also between axial accelerations and the adhesive hardness.

FIG. 9 shows reaction adhesive compositions.

FIG. 10 shows reaction adhesive compositions.

FIG. 11 shows adhesive compositions.

FIG. 12 shows properties of optical discs.

FIG. 13 shows properties of optical discs.

DETAILED DESCRIPTION OF THE PREFERRED EMBODIMENTS

Figure 1:
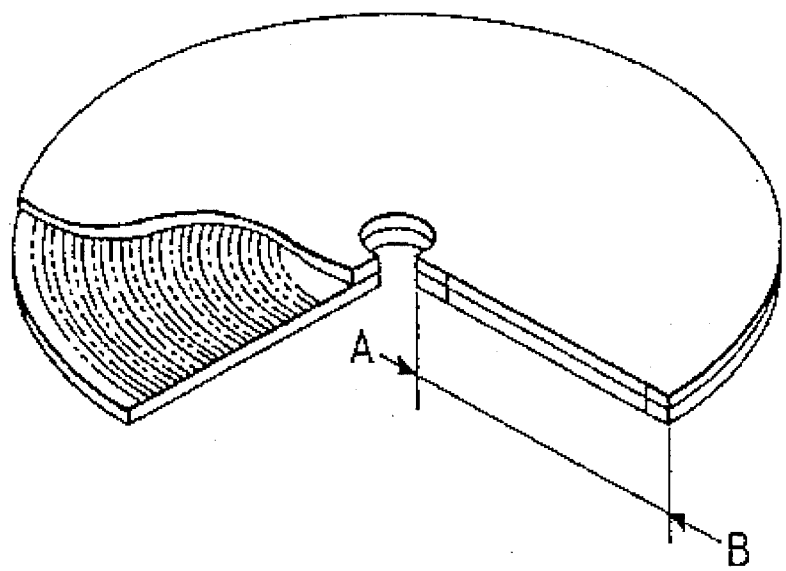
FIG. 1 shows an exterior view of an optical disc.

The inventors of the present invention have discussed preferred specifications for the optical disc from a view point of minimizing the defects in the optical disc arising at the time of its manufacture, deformation due to high speed access and high speed rotation during its operation, and warp and deflection or peeling due to aging under storage.

As a result, the inventors have gained considerable knowledge as follows on the optimization of the design specifications for the optical disc. (A) The object of the present invention is capable of being accomplished by providing an optical disc having a cross-sectional structure comprising a pair of transparent substrates, each provided with at least one layer of a recording film formed on the plane of information patterns thereof, and bonding and laminating the pair with an adhesive, wherein the same optical disc is characterized by having an instantaneous axial acceleration <2 G measured at room temperatures, a skew angle <5 mrad measured at room temperatures, and a skew angle <5 mrad measured at room temperatures after being left for one hour as heated at 80° C. The last part of the above expression that "a skew angle <5 mrad measured at room temperatures, and a skew angle <5 mrad measured at room temperatures after being left for one hour as heated at 80° C." can be rewritten in terms of shear mass such that "a shear mass <20 μm measured at room temperatures after being left for one hour as heated at 80° C." An optical disc which satisfies the design specifications of the invention is free from defects arising from at the time of manufacture, deformation due to high speed access or high speed rotation during its operation, and warp and deflection or peeling due to aging under storage. The design specifications according to the present invention will be set forth in the following.

The foregoing instantaneous axial acceleration refers to an instantaneous axial acceleration exerted upon the plane of the optical disc during its rotation, corresponding to the degree of irregularity defects in the surface of an optical disc. Thereby, the greater the axial acceleration measured, the greater the irregularity defects are present, which, thereby provides information on the existence or the degree of defects arising at the time of its manufacture. The skew angle refers to an angle of deflection between the incident laser beams and the reflecting beams thereof. As the greater skew angle measured indicates the greater degrees of the deformation, warps or peeling being present, thereby it will be possible to obtain information regarding deformation due to high speed access or high speed rotation during operation of the optical disc, and warp or peeling due to aging during its storage. The shear mass refers to a shear occurring between a pair of transparent substrates each having at least one layer of a recording film formed on the plane of information patterns. As the greater shear mass indicates there being present a greater degree of deformation or peeling, it thereby enables to provide information on the deformation due to high speed access or high speed rotation during operation of the optical disc, and also warps or peeling due to aging during its storage. Thereby, with respect to the deformation or peeling in the optical disc, pertinent information can be obtained through at least one of the skew angle and the shear mass measured.

Further, the instantaneous axial acceleration, the skew angle and the shear mass will be described quantitatively in the following. The quantities of these parameters as above are determined as to whether they can provide an optical disc, given with such quantities, capable of recording and reproducing information, and also as to whether the defects, deformation and peeling can be detected through visual inspection.

In a recording head for writing and reproducing information with laser beams on or from an optical disc, laser beams are focused on the plane of the optical disc through a condensing lens in the head to write or read information for storage or reproduction. However, due to any defects, deformation or peeling in the optical disc, in case the laser beams become impossible to be focused, inadequate recording and reproduction properties result in. Thereby, there exists a close relationship between the properties of the optical disc and that of the optical head, thus, judgement regarding the properties of any optical disc whether it is excellent or inferior must be done in full consideration also of the properties of a related optical head. Thereby, according to the present invention, an optical head having a focus depth of about 2 micron meter indicative of its typical optical properties has been utilized in experiments to verify its applicability in recording and reproducing information under various conditions. As the result of experiments, it has been concluded that an optical disc having an instantaneous axial acceleration <2 G measured at room temperatures, a skew angle <5 mrad measured at room temperatures, a skew angle <5 mrad measured at room temperatures after being left for one hour as heated at 80° C., and a shear mass <20 µm measured at room temperatures after being left for one hour as heated at 80° C. is capable of recording and reproducing information effectively. Further, the focusing depth is given by $\lambda/(NA)^2$, where NA is the number of aperture of a lens, and $\lambda$ is the wavelength of a laser beam source. On the other hand, with respect to the visual inspection, existence of any defects, deformation or peeling in the optical discs has been checked through irradiating the surface of an optical disc with light, and projecting its reflective light to form a magnified image for easier inspection. Further, the measurements on the instantaneous axial acceleration, the skew angles and the shear mass have been conducted at room temperatures. As for the skew angles and shear mass, however, they were measured both at room temperatures and after being left for one hour as heated to 80° C. Namely, the measurements of the instantaneous axial acceleration have been conducted only at room temperatures, as they are sufficient to provide information on the defects arising at the time of manufacture of the optical discs. However, the measurements of the skew angles and shear mass have been conducted also after leaving the optical discs for one hour as heated to 80° C., in consideration that the heat generated in an optical disc system subject to high speed access or high speed rotation during operation thereof, or the temperature thereof under storage may become 50° C. or so. According to the present invention, in order to make appraisal thereof in a short time, the measurements on the optical disc have been carried out after being left for one hour as heated to 80° C., which approximately corresponds to a case where the same is left for 1000 hours at temperatures between 50° and 60° C. By means of such arrangements and procedures, pertinent information regarding deformation due to high speed access or high speed rotation during operation of the optical disc, and warps and deflection or peeling in the optical disc due to aging under storage thereof can be obtained. Examples of the experiments conducted on respective cases will be described in detail later. Then, from the results of such experiments, the aforementioned object of the present invention has been verified to be accomplished according to the design specifications for the optical disc pursuant to the present invention. Concurrently, another knowledge as to preferred adhesives has been obtained such that in order to satisfy the object of the present invention an adhesive to be utilized should be reaction type adhesive and should have a Shore hardness between A30 and A80 after cure.

This knowledge obtained on the preferred adhesives will be described in detail in the following. In order to prevent the inclusion of defects at the time of manufacture of optical discs, the design specifications for the optical discs may only satisfy such that the instantaneous axial acceleration be less than 2 G. As the result of the experiments conducted taking special notice on the preferred adhesives to be employed, it has been concluded that such adhesives should be limited to the reaction adhesives and its Shore hardness value should be less than A80. On the other hand, in order to preclude dynamic deformation due to high speed access or high speed rotation during operation of optical discs, and warps and deflection or peeling due to aging thereof under storage, the design specifications for the preferred optical discs should be adapted only to satisfy such that the skew angle measured at room temperatures be less than 5 mrad., and that the skew angle measured after being left for one hour as heated to 80° C. be less than 5 mrad. As the result of the experiments conducted taking special notice of the preferable adhesives to be employed, it has been concluded that such adhesives should be limited to the reaction adhesive and its Shore hardness value should be greater than A30. Further, the foregoing expression that "the skew angle measured after being left for one hour as heated to 80° C. be less than 5 mrad" may be restated in terms of the shear mass such that "the shear mass measured after being left for one hour as heated up to 80° C. be less than 20 µm". Thereby, as the result, it has been concluded that in order to preclude defects in the optical discs at the time of manufacture thereof, dynamic deformation due to high speed access or high speed rotation during operation thereof, and warps and deflection or peeling due to aging during storage thereof, it is preferred for the adhesives to be a reaction type and to have a Shore hardness between A30 and A80 after cure.

Next, preferred methods of manufacturing optical discs having aforementioned design specifications will be set forth from (D) through (F) below.

(D) A method of manufacturing optical discs characterized by comprising steps of:
  (1) forming a UV curing resin on the surface of a stamper having information patterns, and forming a transparent substrate on said UV curing resin,
  (2) irradiating UV rays for exposure, and transferring the information patterns of the stamper to the UV curing resin and the transparent substrate,
  (3) removing the UV cured resin and the transparent substrate from the surface of the stamper having the information patterns to obtain a replica substrate,
  (4) forming a recording film on the surface of the replica substrate having information patterns, and
  (5) disposing a pair of replica substrates each having a recording film to face each other on the sides of the recording films, and bonding the pair with an adhesive which has a Shore hardness between A30 and A80.

(E) A method of manufacturing optical discs characterized by comprising steps of:
  (1) forming a transparent substrate on the surface of a stamper having information patterns, and transferring the information patterns of the stamper to the transparent substrate,
  (2) severing the transparent substrate from the stamper, which was formed on the surface of having its information patterns, and obtaining a replica substrate,
  (3) forming a recording film on the surface of the replica substrate having transferred information patterns, and
  (4) disposing a pair of replica substrates each having a recording film to face each other on the sides of the recording films, and bonding the pair with an adhesive which has a Shore hardness between A30 and A80.

(F) A method of manufacturing optical discs characterized by comprising steps of forming a recording film on the surface of the replica having information patterns, disposing a pair of replica substrates having the recording film to face each other on the sides of the recording films, and bonding the pair with an adhesive which has a Shore hardness between A30 and A80.

In the following, the methods of manufacturing optical discs according to the present invention will be disclosed in detail. The stamper according to the present invention, the surface of which is formed such as to have irregularities of recessed and raised portions corresponding to information patterns, is not specifically limited in the type or kind only if its duplication mold is provided with a good releasability. For instance, it may include electro-cast stampers, resin mold stampers, glass stampers and the like.

The transparent substrate, which is a medium through which passes a laser beam for recording and reproducing information, is not limited in the type or kind only if its optical distortion, a yardstick indicative of its overall optical properties, is less than 50 nm. For example, such will include, without limiting thereof, substrates made of glass, polymethyl methacrylate, polycarbonate, polyolefine, thermal or light curing resins, and the like.

The recording film, which senses a light spot having a diameter approximately between 0.6 and 1 μm, and forms record domains without going through phase changes or shape changes normal with such types subjected to light or magnetic fields, is not limited in the kind of materials only if it is provided with a C/N ratio larger than 60 dB. For instance, such will include, without limiting thereof, films made of tellurium oxides (TeOx), SbSe/BiTe lamination, rare earch transition metal amorphous alloys, TbFeCo oxides, GdTbFe oxides, DyFeCo oxides, TbDyFeCo oxides, garnet oxides, Pt/Co lamination, GeSbTe, InSeTeCo, InSbTe, In-Sb alloys and the like.

When a reaction adhesive selected consists of an accelerator primer and a one-part anaerobic adhesive, the lamination bonding process thereof will become easier by separately applying the accelerator primer component to the surface of a recording film formed on the transparent substrate of one member of a pair to be laminated, and applying the one-part anaerobic adhesive component on the surface of a recording film formed on the transparent substrate of another member of the pair to be laminated.

Lamination bonding under deoxygenation atmosphere permits a uniform reaction curing to proceed in the reaction adhesive thus preventing the occurrence of uncured portions thereof. This is because that in the presence of oxygen, radicals in the process of curing reactions react easily with oxygen, blocking uniform curing thereof, thereby adversely affecting to produce uncured portions thereof. Further, as long as the lamination bonding proceeds under deoxygenation atmosphere, there may occur no adverse effect, even if there are present nitrogen, inert gases and the like.

Next, preferred reaction type adhesives utilized in manufacture of optical discs according to the present invention will be described in detail in the following. The reaction adhesive which bonds chemically with an object to be bonded through chemical reactions is superior to the thermoplastic hot-melt adhesive in bonding strength, heat resistance and mechanical strength. When applied to the manufacture of optical discs, they are capable of providing high quality optical discs which are highly reliable because of their excellent bonding strength, are fit for use in various environments because of their excellent heat resistance, and withstand high speed rotation because of their excellent mechanical strength. In an example of experiments which will be described in the following, a one-part anaerobic adhesive which uses an accelerator primer in combination is utilized. The accelerator primer which serves to initiate curing reactions in the one-part anaerobic adhesive, is not limited in types or kinds, only if the,curing process is not substantially affected by its amount to be applied. For instance, such will include, without limiting thereof, organometallic compounds, ferric chloride, ferrocene, cobalt naphthenic acid, and the like. Further, in order readily to provide a thin coating of the accelerator primer and concurrently to prevent the occurrence of any wrinkle due to uneven curing, it is preferred for the viscosity thereof to be between 1 and 100 cp. Further, a thickness of applied coating of the accelerator primer is preferably from 0.01 to 1 μm such as to ensure sufficient action to be effected to initiate the reactions but to prevent a flow of the primer to occur during lamination bonding. The methods of applying such accelerator primers are not limited only if they are capable of providing a coating thickness of 0.01 to 1 μm. For example, such will include, without limiting thereof, the spray coating, spin coating, roll coating, dip coating and the like.

The one-part anaerobic adhesive is not limited to any particular type provided that its curing rate does not change according to the material of surfaces to be bonded, and a curing rate for it alone is preferably slow, which, however, can be adjusted to increase corresponding to the process speed of manufacture through contact with the accelerator primer. More particularly, such an adhesive having properties to cure in 1 to 2 hours by it alone and cure in 30 seconds to 2 minutes when in contact with an accelerator primer will facilitate alignment or positioning of a pair of transparent substrates to be laminated with improved workability. Further, the composition of one-part anaerobic adhesives is made of a preferred mixture of a polymethacrylic monomer (or oligomer) as a main component thereof, a curing agent, an accelerator, a preservation stabilizer and the like. Here, the polymethacrylic monomer (or oligomer) refers to at least one of the multifunctional monomers and the one functional monomers, either used alone or in mixture of two or more of them. The preferred multifunctional acrylic monomer, for example, includes acrylate with polyhydric alcohol, methacrylate with polyhydric alcohol, trymethylolpropan tryacrylate, trymethylolpropan trymethacrylate, neopenthyl glycol diacrylate, neopenthyl glycol dimethacrylate, ethylene glycol diacrylate, ethylene glycol dimethacrylate, diethylene glycol diacrylate, diethylene glycol dimethacrylate, epoxy acrylate, epoxy methacrylate, urethane polyacrylate, urethane polymethacrylate, 1.6 hexanedihol diacrylate, 1.6 hexandihol dimethacrylate, 1.10 decanedihol diacrylate, 1.10 decanedihol dimethacrylate, dipentaerythritol hexaacrylate, dipentaerythritol hexamethacrylate, and the like. Next, the one functional acrylic monomer, for example, includes hydroxyethyl acrylate, hydroxyethyl methacrylate, hydroxypropyl acrylate, hydroxypropyl methacrylate, hydroxybutyl acrylate, hydroxybutyl methacrylate, tetrahydroflufyl acrylate, tetrahydroflufyl methacrylate, cyclohexyl acrylate, cyclohexyl methacrylate, benzyl acrylate, benzyl methacrylate, methoxypolyethylene glycol acrylate, lauryl acrylate, lauryl methacrylate, stearyl acrylate, stearyl methacrylate, isoborneol acrylate, isoborneol methacrylate, phenoxyethyl acrylate, phenoxyethyl methacrylate, phenoxypolyethylene glycol acrylate, phenoxypolyethylene glycol methacrylate, and the like. The aforementioned curing agent includes, for example, t-butyl hydroperoxide, p-methane hydroperoxide, cumene hydroperoxide, diisopropylbenzen hydroperoxide, and the like. The foregoing accelerator includes, for example, ethanol amine, diethanol amine, triethanol amine, N.N dimethyl aniline, benzen sulphanil-amide, cyclohexyl amine, triethyl amine, butyl amine and the like. The aforementioned preservation stabilizer includes, for example, benzoquinone, hydroquinone, and the like. Further, preferred amounts of a thickener, a plasticizer and the like may be added thereto.

Further, the aforementioned one-part anaerobic adhesive may well include such ones that cure under UV irradiation, provided that they accompany no defects or corrosion in the record films due to air bubbles included during lamination bonding. Into such a one-part anaerobic UV curing adhesive is added a preferred amount of a photo polymerization initiator from 1 to 5 wt % within which range the same will be effective to accelerate, without detriment to, the curing reaction in the main component. Such a photo polymerization initiator is utilized singularly or in mixture of two or more of them, which include, for example, benzyl, benzyl class such as methyl-obenzoate, benzoin, benzoinethyl ether, benzoinispropyl ether, benzoin class such as benzoinisbutyl ether, benzophenone, benzophenone class such as 4-methoxybenzophenone, acetophenone, acetophenone class such as 2.2-diethoxyacetophenone, benzylmethyl, 1-4(ispropylphenyl)-2-hydroxy-2-methylpropanal-1-, and the like.

Preferred embodiments according to the present invention will be set forth in detail in the following with reference to the accompanying drawings.

Preferred Embodiments 1, 2

Figure 2:
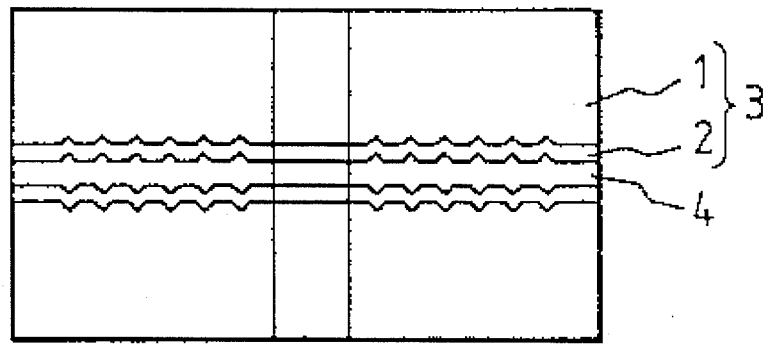
FIG. 2 shows a cross-sectional view of an optical disc.

FIG. 1 shows an exterior view of an optical disc. A cross-sectional view of the optical disc of FIG. 1 taken along A-B is shown in FIG. 2. With reference to FIG. 2, an optical disc of an embodiment of the present invention is composed of a pair of replica plates 3, each provided with a recording layer, and bonded together via an adhesive. layer 4 having a Shore hardness of A30 to A80. Each of the replica plates 3 provided with the recording film consists of a replica plate 1 and a recording layer 2.

For the above adhesives having a Shore hardness of A30 to A80, various types of adhesives were prepared by mixing component group a and component group b with their constituting components varied, and used in combination with an accelerator primer(Loctite's Locic) as shown in FIG. 9, in which the component group a is selectively comprised of three kinds of constituting components of: a mixture acrylic anaerobic adhesive which comprises a base monomer of propylene glycol diacrylate (molecular weight: approx. 200) 45 weight part, a dilution monomer of 1,10 decanedihol diacrylate 25 weight part, an adhesion accelerator monomer of hydroxybutyl methacrylate 30 weight part and a peroxide 2 weight part; an acrylic anaerobic adhesive available in the market (Loctite's 601); and another acrylic anaerobic UV curing adhesive (Loctite's 326), and the component group b is comprised of acrylic monomers.

Figure 3:
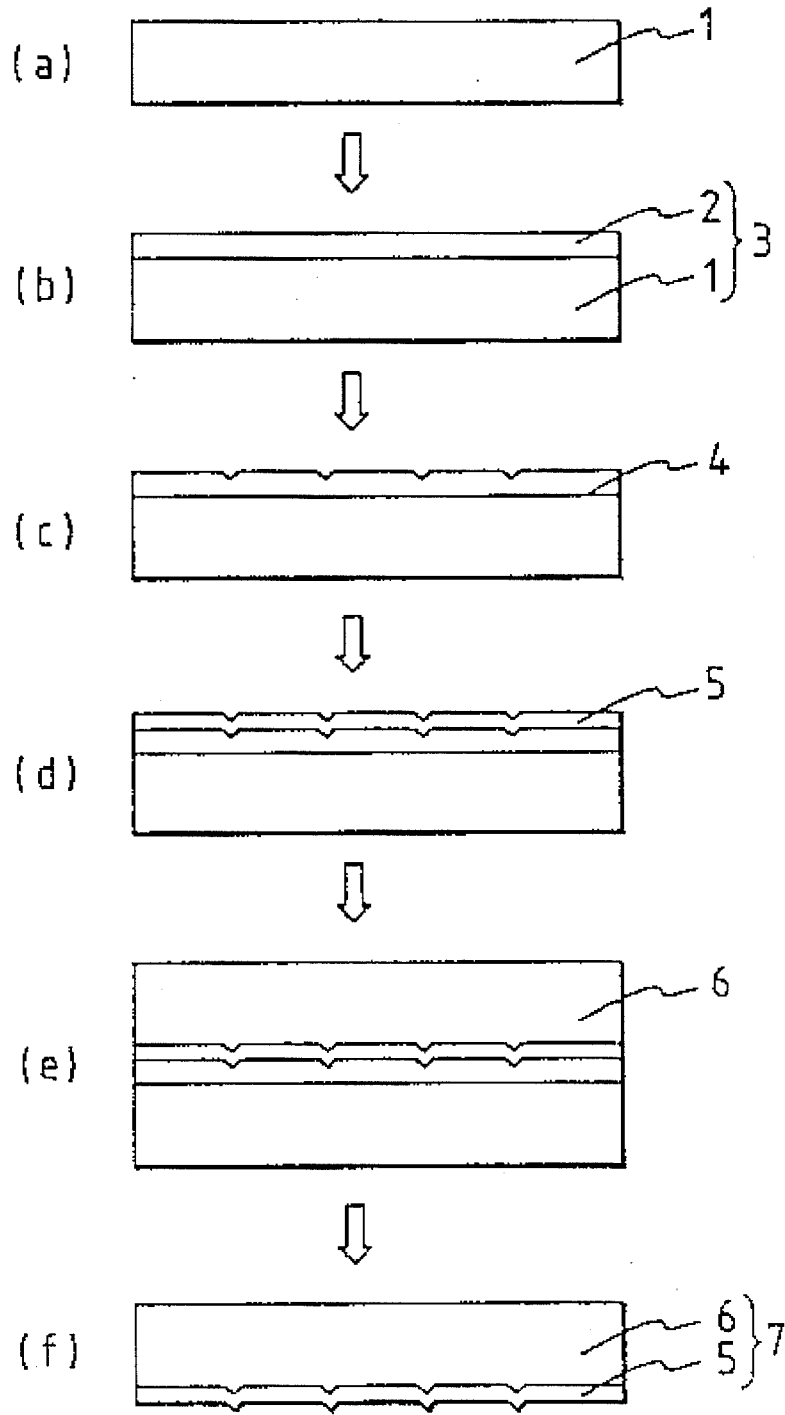
FIG. 3 shows process diagrams explanatory of manufacturing processes of a stamper.

In this embodiment, adhesives of examples 1 and 2 in FIG. 9 were utilized in the manufacture of a stamper to yield optical discs according to the present invention as illustrated in FIG. 3 from steps (a) through (f).

With reference to FIG. 3, a stamper is prepared as follows.

In step (a) a glass disc 1 (outer diameter: 350 mm, inner diameter: 10 mm, thickness: 10 mm) both surfaces of which were polished is provided. In step (b) on one of the polished surfaces of glass disc 1 is formed a positive type photoresist 2 by spin coating to a thickness of 0.14 μm, thus providing a glass disc 3 with a photo resist. Then, in step (c) a recording machine writes information signals with Ar laser (wavelength: 458 nm) in the surface of the photo resist of glass disc 3, then, the photo resist surface is developed to form recessed and raised portions of grooves and pits representing the information signals, thus furnishing a glass master disc 4. In step (d) a Ni film 5 is formed on the surface of photo resist of the glass master disc 4 by the vapor deposition method to a thickness of 40 nm. Then, in step (e) an electrocast film 6 is formed to a thickness of 300 μm by the electroplating method utilizing the Ni film 5 as an electrode. Subsequently, in step (f) the glass disc 1 is severed from between Ni film 5 to furnish a Ni stamper 7.

Figure 4:
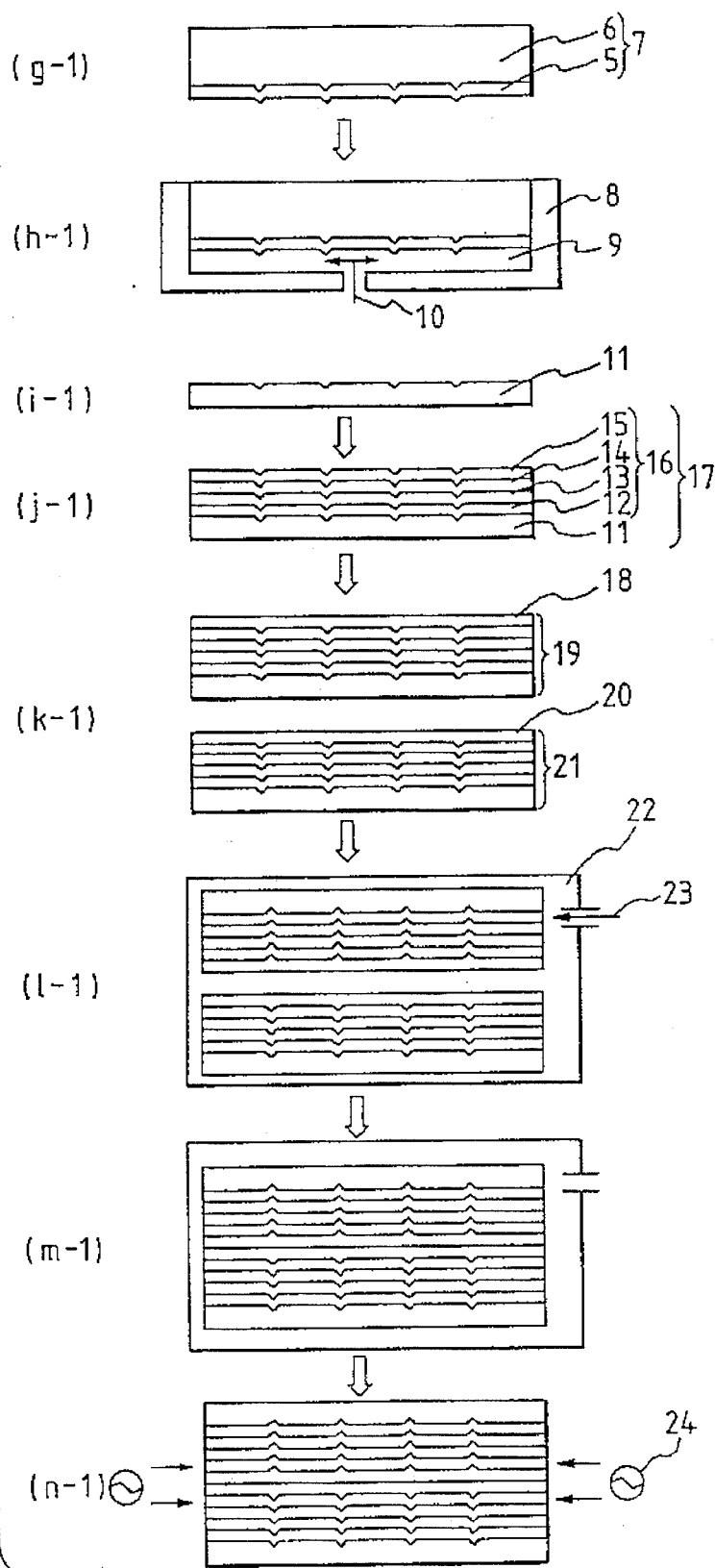
FIG. 4 shows process diagrams explanatory of manufacturing processes of an optical disc.

Then, by means of the stamper 7 thus furnished, optical discs are produced according to a method of manufacture thereof as illustrated in FIG. 4 from (g-1) through (n-1).

The above stamper 7 is fitted in a mold support 8 in step (g-1), then in step (h-1) hot-melt polycarbonate resin 10 (molecular weight: approx. 15000) is injected into a space 9 (outer dia.: 300 mm, center pore dia.: 35 mm, thickness: 1.2 mm) inside the mold support to produce a replica substrate 11(outer dia.: 300 mm, center pore dia.: 35 mm, thickness: 1.2 mm) on the surface of which are transferred the recessed and raised portions of grooves and pits of the stamper as shown in step (i-1). Then, in step (j-1), on the surface of the replica substrate 11 having information patterns thus duplicated, are formed a SiN enhance film 12 (30 nm thick), a TbFeCo magnetic film 13 (30 nm thick), an AlN reflective film 13 (30 nm thick), and a SiN protective film 14 (30 nm thick), layer on layer by sputtering, thereby furnishing a replica substrate 17 provided with a recording film 16 prepared as above. Next, in step (k-1), a pair of the above replica substrates 17 provided with the foregoing recording film 16 are prepared, one of which is then applied with a reaction adhesive 18 by spin coating (30 μm thick) to furnish a replica substrate 19 which is thus provided with the adhesive formed on the recording film, and the rest of the pair is applied with a primer 20 by spin coating (at 2000 rpm) to a thickness of 0.1 μm to furnish another replica substrate 21 which is thus provided with the primer formed on the recording film. In step (l-1), the above pair of replica substrates 19 and 21 are disposed in a hermetically sealed space 22 such that the coated surfaces thereof face each other at a distance of 5 mm. Then, the space 22 is substituted with nitrogen gas 23 for 60 seconds in order to provide deoxygenation atmospheres. Then, in step (m-1) the pair of replica substrates 19 and 21 are moved for alignment, then bonded together. Further in step (n-1), by using ultraviolet irradiation equipment 24, ultraviolet rays were irradiated onto the adhesives squeezed out of the peripheries exterior and interior of the disc, thus accomplishing an optical disc according to the invention.

Preferred Embodiments 3 and 4

Figure 5:
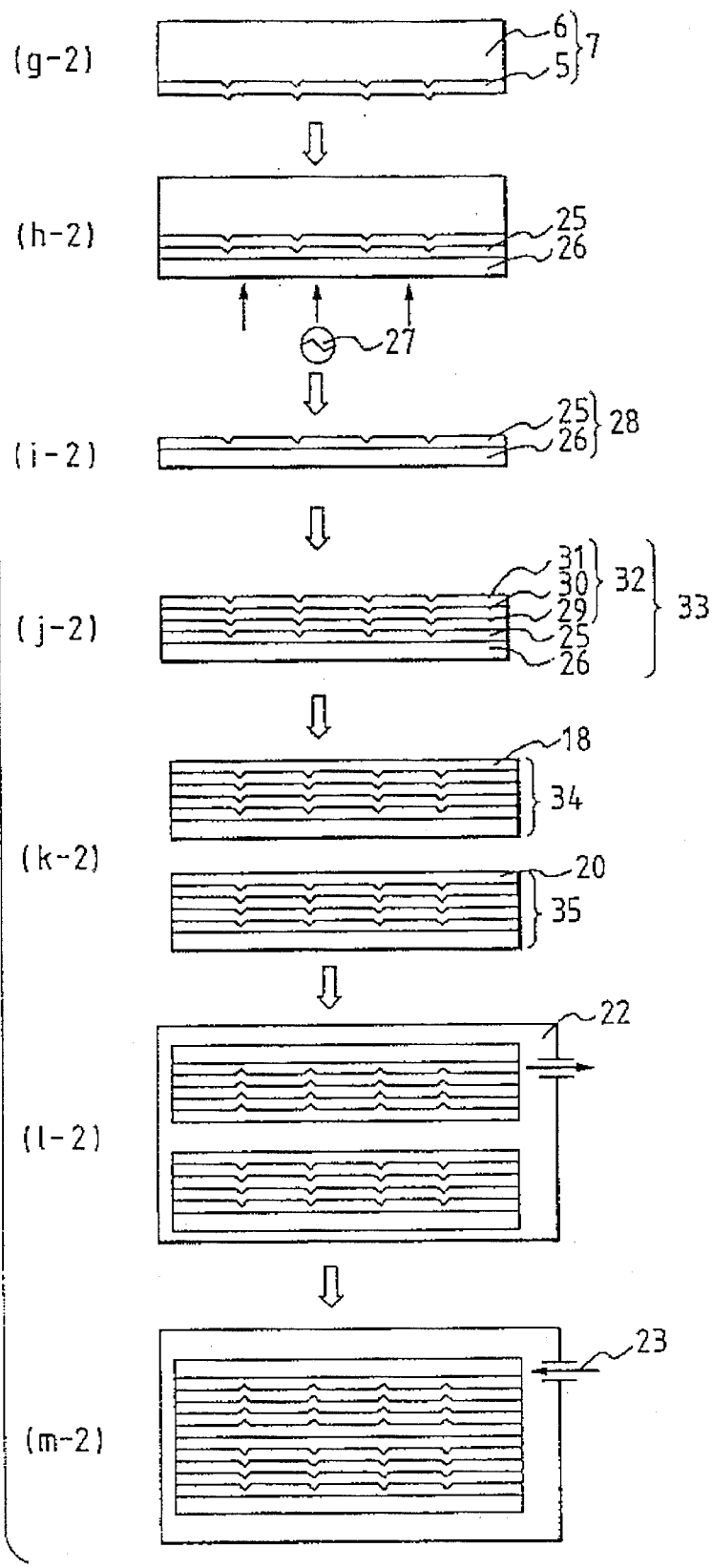
FIG. 5 shows another process diagram explanatory of manufacturing processes of an optical disc.

In this embodiments, adhesives of examples 3 and 4 in FIG. 9 were used in the manufacture of a stamper which was prepared in the same manner as the embodiments 1 and 2, then utilizing such a stamper an optical disc was produced according to a method of manufacturing thereof as shown in FIG. 5 from steps (g-2) through (m-2).

In step (g-2), the aforementioned stamper 7 was utilized as a mold, and in step (h-2) a UV curing resin 25 (with viscosity of 200 cp) was trickled onto the recessed and raised surface of the stamper 7, then the trickled UV curing resin 25 was pressed with a plastic plate 26 (outer dimension: 300 mm, internal dia.: 35 mm, thickness: 1.1 mm) to uniformly extend the adhesive to a film thickness of 80 micron m. After that, by utilizing the UV irradiation equipment 27, UV rays were irradiated through the plastic plate on the UV curing resin 25 to cure (under curing conditions: UV intensity; 100 mW/cm$^2$, for 30 s). In step (i-2), the UV cured resin 25 was severed from the stamper 7 at the interface thereof to obtain a replica substrate 28 on the surface of which were transferred the recessed and raised irregularities of grooves and pits from the stamper 7. In step (j-2), on the surface of the replica substrate 28 obtained as above, there were formed a GeSbTe recording film 29 (film thickness: 30 nm), an SbBi reflective film 30 (film thickness: 20 nm), and an SiN protective film 31, successively by sputtering, thus providing a replica substrate 33 which was provided with a lamination recording film 32. In step (k-2), a pair of the above replica substrates 33 provided with the lamination recording film were prepared, the surface of one of the pair substrates 33 was applied with a reaction adhesive 18 by spin coating (to a film thickness of 30 μm) to provide a replica substrate 34, and the surface of the other one of the pair substrates 33 was spin coated (rotation: 2000 rpm) with a primer 20 on the recording film thereof to a film thickness of 0.1 μm to provide a replica substrate 35, respectively. In step (l-2), the above pair of the replica substrates 34 and 35 were disposed at a distance of 5 mm in a hermetically sealed space 22 with the coated surfaces thereof facing each other, and the space 22 thereof was evacuated to 20 mTorr in order to attain a deoxygenation atmosphere. In step (m-2) the evacuated space was returned to the atmospheric pressure filled with nitrogen gas 23, then the pair of the replica substrates 34 and 35 disposed therein were bonded together to provide an optical disc according to the present invention.

Preferred Embodiments 5, 6

In this preferred embodiments of the invention, adhesives of examples 5 and 6 in FIG. 9 were used in the manufacture of a stamper which was prepared in the same manner as the embodiments 1 and 2, then utilizing such a stamper, optical discs were produced according to a method of manufacturing thereof as shown in FIG. 6 from steps (g-3) through (m-3).

In step (g-3), the stamper 7 described above was attached to a mold 8, then in step (h-3) a hot-melt polycarbonate resin 10 (molecular weight: approx. 15000) was injected into a space 9 (outer dia.: 300 mm, center pore dia.: 35 mm, thickness: 1.2 mm) inside the mold, thus providing a replica substrate 11 (outer dia.: 300 mm, center pore diam.: 35 mm, thickness: 1.2 mm) on the surface of which the irregularities of grooves and pits of the stamper were transferred as shown in step (i-3). Then, in step (j-3), on the surface of the above replica substrate 11 having transferred information patterns were formed a GeSbTe recording film 29 (film thickness: 30 nm), an SbBi reflective film 30 (film thickness: 20 nm) and an SiN protective film 31 (film thickness: 30 nm) successively by sputtering, thereby providing a replica substrate 36 provided with a lamination recording film 32. In step (k-3), a pair of the above replica substrates 36 provided with the lamination recording film were prepared. On the surface of one of the pair of the substrates, reaction adhesive 18 was spin coated to a thickness of 30 μm, thus providing a replica substrate 37 provided with the recording film and the adhesive applied thereon. On the surface of the other one of the pair of the substrates 36, a primer 20 was applied to a film thickness of 0.1 μm by the spin coating method (rotation: 2000 rpm), thereby providing a replica substrate 38 provided with the recording film and the primer coated thereon. In step (l-3), the above pair of the replica substrates 37 and 38 were disposed at a distance of 5 mm in the hermetically sealed space 22 with the coated surfaces thereof facing each other, then the space 22 was substituted with nitrogen gas 23 for 60 seconds to attain a deoxygenation atmosphere. In step (m-3), after moving horizontally the pair of the replica substrates 37 and 38 for alignment, they were adhered together. Further, in step (n-3), adhesives squeezed out of the peripheral sides external and internal of the disc were exposed to UV rays from the ultraviolet irradiation equipment 24 under irradiation conditions: UV intensity of 30 mW/cm$^2$, duration of 10 seconds, thereby accomplishing an optical disc according to the present invention.

Preferred Embodiment 7

In this preferred embodiments of the invention, an exemplary adhesive 7 in FIG. 9 was used in the manufacture of a stamper which was prepared in the same manner as the embodiments 1 and 2, then utilizing such a stamper, optical discs were produced according to a method of manufacturing thereof as shown in FIG. 7 from steps (g-4) through (m-4).

In step (g-4), the aforementioned stamper 7 was utilized as a mold, and in step (h-4) a UV curing resin 25 (with viscosity of 200 cp) was trickled onto the recessed and raised surface of the stamper 7, then the trickled UV curing resin 25 was pressed with a plastic plate 26 (outer dimension: 300 mm, internal dia.: 35 mm, thickness: 1.1 mm) to uniformly extend to a film thickness of 80 μm. After that, by utilizing the UV irradiation equipment 27, UV rays were irradiated through the plastic plate on the UV curing resin 25 to cure (under curing conditions: UV intensity; 100 mW/cm$^2$, for 30 s). In step (i-4), the UV cured resin 25 was severed from the stamper 7 at the interface thereof to obtain a replica substrate 28 on the surface of which were transferred the recessed and raised irregularities of grooves and pits from the stamper 7. In step (j-4), on the surface of the replica substrate 28 obtained as above, there were formed a SiN enhance film 12 (film thickness: 30 nm), a TbFeCo magnetic film 13 (film thickness: 30 nm), an AlN reflective film 14 (film thickness: 30 nm) and an SiN protective film 15, successively by sputtering, thus providing a replica substrate 29 which was provided with a lamination recording film 16. In step (k-4), a pair of the above replica substrates 29 provided with the lamination recording film were prepared, the surface of one of the pair substrates 29 was applied with a reaction adhesive 18 by spin coating (to a film thickness of 30 μm) to provide a replica substrate 40, and the surface of the other one of the pair substrates 29 was spin coated (rotation: 2000 rpm) with a primer 20 on the recording film thereof to a film thickness of 0.1 μm to provide a replica substrate 41, respectively. In step (l-4), the above pair of the replica substrates 40 and 41 were disposed at a distance of 5 mm in a hermetically sealed space 22 with the coated surfaces thereof facing each other, and the space 22 thereof was evacuated to 20 mTorr in order to attain a deoxygenation atmosphere. In step (m-4) the evacuated space was returned to the atmospheric pressure filled with nitrogen gas 23, then the pair of the replica substrates 40 and 41 disposed therein were bonded together to provide an optical disc according to the present invention.

Comparative Examples 1 and 2

In this comparative examples of the invention, by utilizing adhesives of comparative examples 1 or 2 in FIG. 9, and according to the same manufacturing method as for the preferred examples 1 and 2, optical discs pursuant to the present invention were fabricated for comparison.

Comparative Examples 3 and 4

In this comparative examples of the invention, by utilizing adhesives of comparative examples 3 or 4 in FIG. 9, and according to the same manufacturing method as for the preferred examples 3 and 4, optical discs pursuant to the present invention were fabricated for comparison.

Comparative Examples 5 and 6

In this comparative examples of the invention, by utilizing adhesives of comparative example 5 in FIG. 9 and comparative example 6 in FIG. 10, and according to the same manufacturing method as for the preferred examples 5 and 6, optical discs pursuant to the present invention were fabricated for comparison.

Comparative Examples 7 and 8

In this comparative examples of the invention, by utilizing adhesives of comparative examples 7 or 8 in FIG. 10, and according to the same manufacturing method as for the preferred example 7, optical discs pursuant to the present invention were fabricated for comparison.

Comparative Examples 9 and 10

In this comparative examples of the invention, by utilizing hot-melt adhesives of comparative examples 9 or 10 in FIG. 11, a pair of replica substrates provided with a recording film as shown in step (i-1) in FIG. 4 explanatory of the preferred examples 1 and 2 were obtained. Then, after applying hot-melt adhesive on the surfaces of the recording films of the pair of the replica substrates by a hot-melt coater to a thickness of 30 μm, the adhesive coated surfaces were disposed facing each other and laminated under a load of 2 kg/cm$^2$ to provide an optical disc of the comparative example 9, and another pair of the same were laminated under a load of 20 kg/cm$^2$ to provide an optical disc of the comparative example 10, respectively.

Comparative Example 11

In this comparative example of the invention, by utilizing one-part anaerobic adhesive of example 11 in FIG. 11, a pair of replica substrates provided with a recording film as shown in step (i-1) in FIG. 4 explanatory of the preferred embodiments 1 and 2 were prepared. After applying the one-part anaerobic adhesive on the surface of the recording film of one of the pair replica substrates by spin coating, the pair of the replica substrates were bonded and laminated under a reduced atmosphere of 20 mTorr to provide an optical disc according to the present invention.

Comparative Example 12

In this comparative example of the invention, by utilizing the two-part unmixture adhesive of comparative example 12 in FIG. 11, a pair of replica substrates provided with a recording film as shown in step (i-1) in FIG. 4 which is explanatory of the preferred embodiments 1 and 2 of the invention were prepared. Then, after applying type A agent of the two-part unmixture adhesive on the recording film surface of one of the pair of the replica substrates, and applying type B agent thereof on the recording film surface of the other one of the pair of the replica substrates by spin coating, the pair of the replica substrates were bonded and laminated under a reduced atmosphere of 20 mTorr to provide an optical disc according to the present invention.

The aforementioned preferred examples 1 through 7 and comparative examples 1 through 12 of optical discs prepared by utilizing various adhesives having different hardness according to the present invention were investigated as to (1) the instantaneous axial acceleration at room temperatures (about 25° C.) which corresponds to the degrees of irregularity defects formed in the interface during bonding and lamination, (2) the skew angle at room temperatures (about 25° C.) which changes corresponding to the degrees of deformation, warps and peeling in the optical disc, (3) the shear mass occurring between a pair of the substrates bonded together, after being left for one hour as heated to 80° C., (4) the disc skew angle after being left for one hour as heated to 80° C., and (5) the presence of defects such as irregularities, warp and peeling in the disc surfaces, detectable (through visual inspection) after bonding and lamination (at the time of manufacturing) and after being left as heated (during operation or storage). The results are shown in FIGS. 12 and 13. Further, respective methods for measurements of the aforementioned characteristics are described in the following.

(1) The instantaneous axial accelerations and (2) dynamic properties of the skew angles were measured with an optical disc dynamic property measurement apparatus (laser wavelength: 780 nm, the number of measuring rotation: 2400 rpm, measurement position: φ 290 mm$^2$).

(3) The shear mass was measured from a displacement between the disc surfaces (film thickness: 30 μm, contact area: 6 cm$^2$) when a shearing load of 500 g was applied.

(5) The detection of defects through visual inspection was conducted by means of the shadowgraph method whereby reflected light from an object illuminated for inspection was projected to form a magnified image. For instance, when there exist irregularities, warps and deflection in the optical discs, they are magnified on a projected image as shadows of light or varied from normal scales.

From the results of FIGS. 12 and 13, relationships as shown in FIG. 8 were obtained for the skew angles and the instantaneous axial accelerations relative to the hardness of adhesives used in respective optical discs. It is clearly understood from FIG. 8 that the skew angles in the discs relative to the hardness of adhesives exceeding A30 fall within a limit of 5 mrad which is an object value, even for the examples left as heated to 80° C. Also, it is indicated clearly in FIG. 8 that the instantaneous axial accelerations in the optical discs relative to the hardness of adhesives below A80 fall within a limit of 2 G which is an object value. The optical discs of the preferred examples 1 through 7 of the invention, which were bonded and laminated with adhesives having Shore hardness between A30 and A80, satisfy the object values for the skew angles and the instantaneous axial accelerations concurrently. On the other hand, the optical discs provided as the comparative examples satisfy only one of the the attributes required as above. Further, the presence of defects was checked for through visual inspection at the time of manufacture of discs and after being left as heated, and it was confirmed that there occurred no defects in the preferred examples 1 through 7 both at the time of manufacture and after being left as heated. In contrast, the optical discs of the comparative examples have exhibited defects. For instance, the comparative examples 1 through 8, 11 and 12 involved defects which occurred at the time of manufacture thereof, and in the comparative example 9 there occurred defects after being left as heated, further in the comparative example 10 there occurred defects both at the time of manufacture and after being left as heated.

Further, with respect to the optical discs of the preferred examples 1 through 7, a series of performance tests were conducted by recording and reproducing information at a disc rotation speed of 2400 rpm on a recording and reproduction apparatus (with a light source of 680 nm laser beams, and a light head utilizing a condenser lens having the number of aperture of 0.55 and a focussing depth of approx. 2 micron m), without causing any degradation in recording and reproduction performance.

As a result, it is verified that the optical discs bonded and laminated with the adhesives (having Shore hardness between A30 and A80) according to the present invention are capable of providing an excellent optical disc having an improved planar surface with less irregularities and deformation caused even under high temperatures environments, thereby providing a high precision performance thereof.

According to the present invention as set forth in detail heretofore, it is capable of implementing an optical disc and a method of manufacturing the same, whereby deformation due to high speed access or high speed rotation, and warp and deflection or peeling due to aging during storage are substantially reduced, thereby realizing a high precision and high reliability optical disc.

We claim:

1. An optical recording and reproduction apparatus having an optical disc and an optical head, said optical disc having a cross-sectional structure comprising a pair of transparent substrates each having at least one layer of a recording film formed on a surface of information patterns thereof and the pair being bonded and laminated with an adhesive, wherein said optical disc is characterized by having an instantaneous axial acceleration <2 G measured at room temperature, a skew angle <5 mrad measured at room temperature and a skew angle <5 mrad measured at room temperature after being left for one hour as heated to 80° C.

2. The optical recording and reproduction apparatus according to claim 1, wherein said adhesive is characterized by being a reaction adhesive.

3. The optical recording and reproduction apparatus according to claim 2, wherein said reaction adhesive is characterized by consisting essentially of an accelerator primer and a one-part anaerobic adhesive.

4. The optical recording and reproduction apparatus according to claim 3, wherein said one-part anaerobic adhesive is characterized by being a one-part anaerobic UV curing adhesive.

5. The optical recording and reproduction apparatus according to claim 3, wherein said accelerator primer is characterized by having a viscosity of between 1 and 100 cp.

6. The optical recording and reproduction apparatus according to claim 3, wherein said one-part anaerobic adhesive comprises acrylate monomer as a main component, a curing agent, an accelerator and a preservation stabilizer.

7. The optical recording and reproduction apparatus according to claim 6, wherein said acrylate monomer is characterized by being at least one of a one-functional acrylic monomer and a multifunctional acrylic monomer.

8. An optical recording and reproduction apparatus having an optical disc and an optical head, said optical disc having a cross-sectional structure comprising a pair of transparent substrates each having at least one layer of a recording film formed on a surface of information patterns thereof and the pair being bonded and laminated with an adhesive, wherein said optical disc is characterized by having an instantaneous axial acceleration <2 g measured at room temperature, a skew angle <5 mrad measured at room temperature and a shear mass <20 µm measured at room temperature after being left for one hour as heated to 80° C.

9. The optical recording and reproduction apparatus according to claim 8, wherein said adhesive is characterized by being a reaction adhesive.

10. The optical recording and reproduction apparatus according to claim 9, wherein said reaction adhesive is characterized by consisting essentially of an accelerator primer and a one-part anaerobic adhesive.

11. The optical recording and reproduction apparatus according to claim 10, wherein said one-part anaerobic adhesive is characterized by being a one-part anaerobic UV curing adhesive.

12. The optical recording and reproduction apparatus according to claim 10, wherein said accelerator primer is characterized by having a viscosity of between 1 and 100 cp.

13. The optical recording and reproduction apparatus according to claim 10, wherein said one-part anaerobic adhesive comprises acrylate monomer as a main component, a curing agent, an accelerator and a preservation stabilizer.

14. The optical recording and reproduction apparatus according to claim 13, wherein said acrylate monomer is characterized by being at least one of a one-functional acrylic monomer and a multifunctional acrylic monomer.

15. An optical recording and reproduction apparatus having an optical disc and an optical head, said optical disc having a cross-sectional structure comprising a pair of transparent substrates each having at least one layer of a recording film formed on a surface of information patterns thereof and the pair being bonded and laminated with an adhesive, wherein said adhesive is characterized by being a reaction adhesive having a hardness after cure between A30 and A80 in Shore hardness.

16. The optical recording and reproduction apparatus according to claim 15, wherein said reaction adhesive is characterized by consisting essentially of an accelerator primer and a one-part anaerobic adhesive.

17. The optical recording and reproduction apparatus according to claim 16, wherein said one-part anaerobic adhesive is characterized by being a one-part anaerobic UV curing adhesive.

18. The optical recording and reproduction apparatus according to claim 16, wherein said accelerator primer is characterized by having a viscosity of between 1 and 100 cp.

19. The optical recording and reproduction apparatus according to claim 16, wherein said one-part anaerobic adhesive comprising acrylate monomer as a main component, a curing agent, an accelerator and a preservation stabilizer.

20. The optical recording and reproduction apparatus according to claim 19, wherein said acrylate monomer is characterized by being at least one of a one-functional acrylic monomer and a multifunctional acrylic monomer.

21. An optical recording and reproduction apparatus having an optical disc and an optical head, said optical disc comprising a pair of replica substrates, each of which comprises a transparent substrate having an information surface with information patterns formed in said information surface and at least one recording film overlying said information surface of the transparent substrate; and an adhesive layer of a reaction adhesive overlying said recording films of the pair of replica substrates, thereby bonding the pair of replica substrates to each other; wherein said adhesive is characterized by having a Shore hardness after cure between A30 and A80.

22. The optical recording and reproduction apparatus according to claim 21, wherein said reaction adhesive is characterized by consisting essentially of an accelerator primer and a one-part anaerobic adhesive.

23. The optical recording and reproduction apparatus according to claim 22, wherein said one-part anaerobic adhesive is characterized by being a one-part anaerobic UV curing adhesive.

24. The optical recording and reproduction apparatus according to claim 22, wherein said accelerator primer is characterized by having a viscosity of between 1 and 100 cp.

25. The optical recording and reproduction apparatus according to claim 22, wherein said one-part anaerobic adhesive comprising acrylate monomer as a main component, a curing agent, an accelerator and a preservation stabilizer.

26. The optical recording and reproduction apparatus according to claim 25, wherein said acrylate monomer is characterized by being at least one of a one-functional acrylic monomer and a multifunctional acrylic monomer.

* * * * *